I. G. CULVER.
ADJUSTABLE COUPLING FOR WAX FIGURES.
APPLICATION FILED AUG. 4, 1916.
1,254,313.
Patented Jan. 22, 1918.
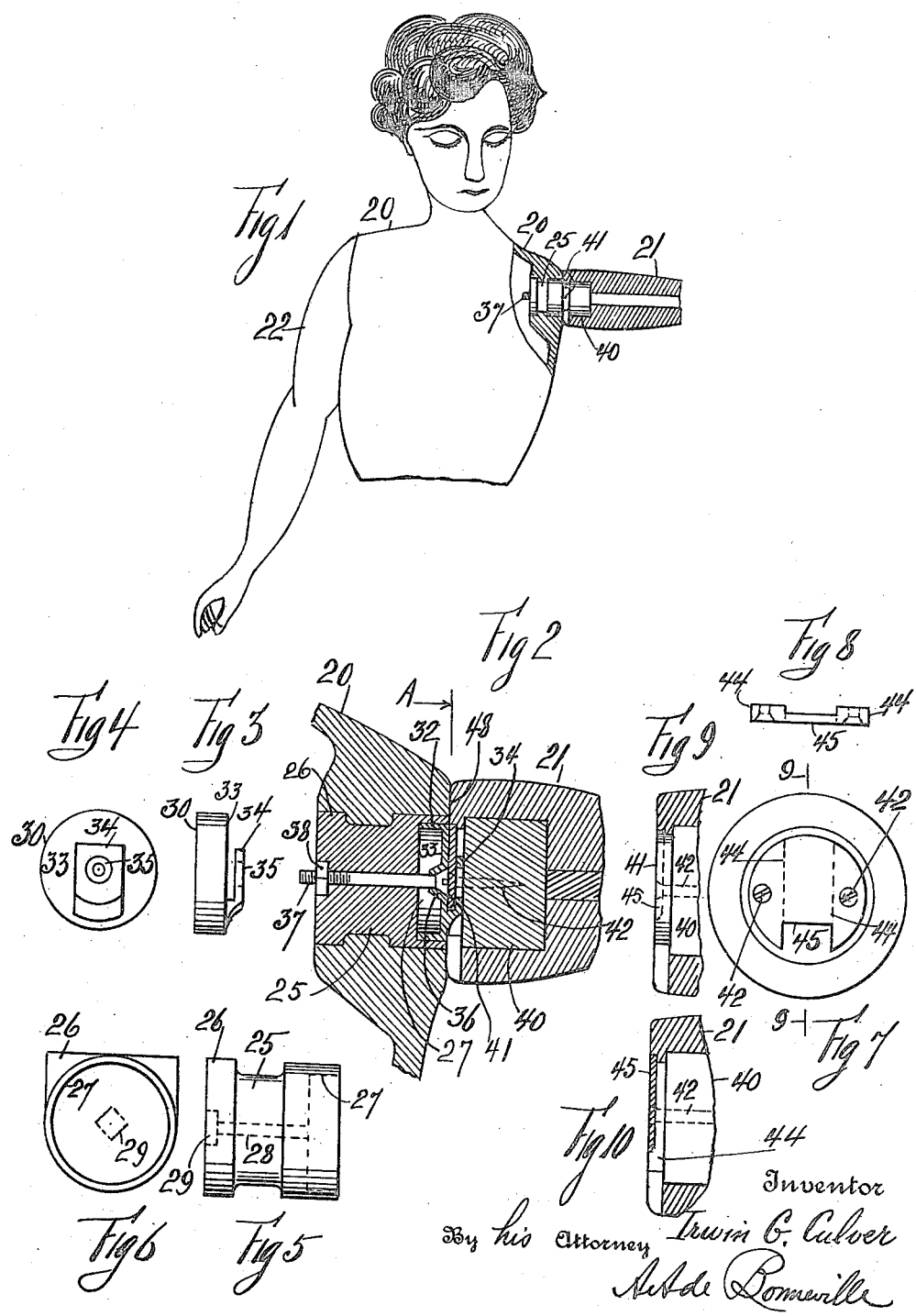

UNITED STATES PATENT OFFICE.

IRWIN G. CULVER, OF NEW YORK, N. Y.

ADJUSTABLE COUPLING FOR WAX FIGURES.

1,254,313.      Specification of Letters Patent.      Patented Jan. 22, 1918.

Application filed August 4, 1916. Serial No. 113,072.

*To all whom it may concern:*

Be it known that I, IRWIN G. CULVER, a citizen of the United States, and resident of the borough of Manhattan, in the county of New York and State of New York, have invented certain new and useful Improvements in Adjustable Couplings for Wax Figures, of which the following is a specification.

This invention relates to adjustable couplings for the members of wax figures and the like.

In the drawings Figure 1 shows a front elevation partly in section of a wax figure and the coupling connected thereto; Fig. 2 shows a vertical longitudinal section of the invention and fragmentary portions of two members of a wax figure; Fig. 3 represents an elevation of one coupling member; Fig. 4 is a right hand side view of Fig. 3; Fig. 5 shows an elevation of a supporting plug of the invention; Fig. 6 is a right hand side view of Fig. 5; Fig. 7 represents one of the members of the wax figure shown in Fig. 2 with its appurtenances when viewed in the direction of arrow "A" and not sectioned; Fig. 8 shows a top plan view of the coupling member shown in Fig. 7; Fig. 9 shows a partial section of Fig. 7 as on the line 9, 9 with a coupling member thereof in full and Fig. 10 shows a partial section taken on the same plane as Fig. 9 with the coupling member sectioned.

In the drawings the shoulder portions of a wax figure are indicated at 20 to which are adjustably coupled arms 21 and 22. A supporting plug is indicated in its entirety by the numeral 25 which is practically cylindrical throughout its entire length with the exception that it has formed at one end a flange 26. At the other end of the plug there is formed a cylindrical cavity 27. A longitudinal opening 28 is formed in the plug with the square recess 29. In the cylindrical cavity 27 is adjustably located a coupling member 30 which comprises the peripheral flange 32 with the cover 33, and a hook 34 with opening 35 extends from the cover 33. In the cover 33 is formed a seat 36 with an opening for the head of a clamping screw 37. A square nut 38 on the screw 37 is located in the recess 29. In the arm 21 there is indicated a supporting block 40 to which there is secured the other member 41 of the coupling by means of the screws 42. The said coupling is discoidal shaped and comprises the segmental wings 44 with the clamping web 45 connecting the same.

To use the invention the coupling members 30 are located in their proper operative positions by slightly loosening the screws 37 from their nuts 38. The said members 30 are then swung in the cavities 27 to the positions desired, after which the said members 30 are tightly secured in place by tightening the bolts 37 and nuts 38. Each of the arms 21 and 22 with its coupling member 41 is then connected to its shoulder 20 by locating the web 45 in the recess between the hook 34 and the cover 33.

It will be noted that the coupling member 41 does not extend beyond the outer face 48 of the arm 21 and therefore a smooth face is provided for the said arm. In view of the fact that the arm is very often inserted in the sleeve of a garment before being coupled in place, the said smooth surface presents no hindrance when the arm is inserted in the sleeve of a garment.

It is evident that the locations of the appurtenances of the couplings might be reversed from the positions shown in the drawings, that is to say, the supporting plugs 25 with their appurtenances might be used for the arms 21, 22 and the supporting plugs 40 with their appurtenances might be used for the shoulder portions 20. The drawings and description show and describe one form of the invention, but I do not limit myself to this form, but claim as my invention all the forms thereof within the spirit of the claims.

Having described my invention what I desire to secure by Letters Patent and claim is:

1. In a device the combination with one portion of a figure of a coupling member which can be secured in any angular position and a second coupling member in another portion of the figure adapted to lock with the first coupling member.

2. In a device of the character described the combination with a figure, of a coupling comprising one member which can be secured in any angular position, a second member carrying an arm adapted to lock with the first member of the coupling.

3. In a device of the character described the combination with a figure, of a coupling member having formed therewith a hook, means to locate the coupling member in different angular positions, a second coupling member having formed therewith a web adapted to engage said hook and an arm connected to said second coupling member.

4. In a device of the character described the combination with a figure, of a supporting plug having a central opening therethrough and having a recess at one end of the plug coaxial with said central opening, the said plug also having a cylindrical cavity at its other end, a cylindrical coupling member in said cylindrical cavity comprising a peripheral flange with a cover, the outer face of said cover being in line with the outer face of the shoulder portion of said figure, a clamping screw extending through said supporting plug and coupling member, the latter having a seat for the head of the screw, a nut on the screw located in the recess of the supporting plug, the coaction of the screw and coupling member permitting the latter to be located in any angular position, a supporting plug in the arm of the figure, a coupling member in the arm fastened to the plug thereof and shaped to detachably lock with the other coupling member.

Signed at the borough of Manhattan in the county of New York and State of New York, this 1st day of August, A. D. 1916.

IRWIN G. CULVER.

Witnesses:
A. A. DE BONNEVILLE,
RALPH E. SLAYTON.

Copies of this patent may be obtained for five cents each, by addressing the "Commissioner of Patents, Washington, D. C."